(12) United States Patent
Mackley et al.

(10) Patent No.: US 8,596,524 B2
(45) Date of Patent: Dec. 3, 2013

(54) BARCODE INFORMATION DISTRIBUTION SYSTEM

(75) Inventors: David John Mackley, Berkshire (GB); Neil Robert Mackley, Berkshire (GB); Ying Zhou, Newbury (GB)

(73) Assignee: Intelligent Retail Limited (GB)

( * ) Notice: Subject to any disclaimer, the term of this patent is extended or adjusted under 35 U.S.C. 154(b) by 0 days.

(21) Appl. No.: 13/233,364

(22) Filed: Sep. 15, 2011

(65) Prior Publication Data
US 2012/0061460 A1    Mar. 15, 2012

(51) Int. Cl.
*G06F 17/00*    (2006.01)
(52) U.S. Cl.
USPC .......................................................... 235/375
(58) Field of Classification Search
USPC ............... 235/375, 383, 385; 705/16
See application file for complete search history.

(56) References Cited

U.S. PATENT DOCUMENTS

| | | | |
|---|---|---|---|
| 6,809,645 B1 * | 10/2004 | Mason | 340/572.1 |
| 6,866,194 B2 * | 3/2005 | Scheurer | 235/385 |
| 7,797,204 B2 * | 9/2010 | Balent | 705/28 |
| 7,827,063 B2 * | 11/2010 | Girdler et al. | 705/16 |

* cited by examiner

*Primary Examiner* — Seung Lee
(74) *Attorney, Agent, or Firm* — Hartman Global IP Law; Gary M. Hartman; Domenica N. S. Hartman

(57) ABSTRACT

A system (10) for distributing barcode information. The system (10) includes a plurality of terminal systems (16a to 16n) in communication with a database system (12). The database system (12) includes a database (22) of item information related to a plurality of item identifiers representative of barcode information. At least one of the terminal systems (16a) requests barcode information from the database system (12). The request including an item identifier representative of a barcode, and in response, the database system (12) transmits barcode information associated with the requested item identifier to the at least one terminal system (16a).

25 Claims, 7 Drawing Sheets

BARCODE INFORMATION DISTRIBUTION SYSTEM

INTRODUCTION

The present invention relates to a base station system, a terminal system, a distribution system, and methods for acquiring and distributing item or product information associated with barcode information for use in updating product or item information in local database(s) of at least one terminal system and the database(s) of at least one base station system.

Barcodes are a form of data that is optically machine-readable and can represent a very limited amount of information on certain manufacturers, suppliers, and their products, range of products, and/or goods and services. Barcodes contain information generally identifying the manufacturer or supplier, different product lines, and a product or range of products or goods.

Barcodes come in many forms, such as linear or 1-D barcodes, 2-D matrix codes, and RF-ID tags, etc. 1-D barcodes represent data with a series of parallel lines having different line widths and the spacing between the lines. 2-D barcodes/matrix codes (also known as symbologies) have various patterns of squares, dots, hexagons and other geometric patterns within images, etc. Radio frequency identification (RF-ID) tags can also be used to provide barcode-type information of a product or a range of products.

Although the original barcode system used parallel lines (bars) to represent information, all the above-mentioned systems that are used to represent data about manufacturers, suppliers, goods and services etc, will be referred, herein, as barcodes, item or product identifiers.

There are many different barcode standards, the most common being the Universal Product Code (UPC) and the European Article Number (EAN) barcode or International Article Number (IAN) barcode.

However, it is to be appreciated that there are many other systems and methods, not limited to only barcodes per se, that represent item or product identification and information of a manufacturer's, supplier's, and/or even a retailer's products and/or goods and services. These other systems include automatic identification and data capture systems, which generally can automatically identify objects, items or products, collect data about them, and enter that data directly into computer systems (i.e. without human involvement). There are many different platforms for these technologies, which use, among other things, barcodes, RFID, biometrics, magnetic stripes, optical character recognition (OCR), smart cards, and voice recognition.

In any event, whatever the form a manufacturer's or supplier's (even a retailer's) product information takes, this information still needs to be entered into a manufacturer's, supplier's, and/or a retailer's inventory management system or inventory database.

For example, a small independent retailer can receive thousands of products from multiple suppliers or manufacturers. Manufacturers and suppliers can purchase their own distinct range of barcodes (provided to them by various barcode standards organisations). These barcodes can then be used to represent that manufacturer's or supplier's products, but only contain a small amount of data identifying the manufacturer or supplier and their different products (or cases/pallets of products) with some external data, such as quantity or product type can be provided.

On receiving a pallet of goods, a small retailer can scan the barcode, but a supplier's product information can be quite scant or in a proprietary format. Although some manufacturers and suppliers may provide the retailer with a proprietary formatted spreadsheet of the barcode information related to a product, in most cases the retailer still needs to manually enter for each barcode their own definition (or an intelligible definition) of the product description, quantity, colour, model, supplier, and other enhanced product information such as product images that the retailer recognises is useful to them, but which is not included or represented by the data of the supplier's barcode. However, informative and accurate data entry for such a large number of products can become a very costly, laborious, and time consuming process.

Efforts to reduce this time consuming process may result in entering data using a form of coded or short-hand notation or a compressed form that is meaningful only to a handful of staff. This can result in sales staff and other managers of the retailer not being able to decipher the information, for example not being able to distinguish between the quantities of a product with different colours and features might become difficult. This leads to a knock on effect of limiting or unnecessarily delaying the advice that sales staff can provide to customers of the products they may have in stock.

It is particularly important, as inventory management systems move from being stand-alone systems to becoming interconnected with other services, such as online retailing, that retailers are able to efficiently and accurately update/enter meaningful product or item information and enhanced product information into their systems. Having a reliable and accurate system of data entry allows product information in the inventory management system to be automatically retrieved and displayed with for sales staff and shoppers—either at the sales floor and/or via online shopping etc. It is recognised that efficient and accurate data-entry, combined with the requirement for real-time access by customers and sales staff to product information is an increasingly important part of a retailer's business.

It is an object of the present invention to provide an efficient and effective method of maintaining a local database inventory system of product or item information associated with barcode information and the like, and to improve the capture and accuracy of product or item information and enhanced product or item information such that sales floor staff and online shopping services can automatically access such information with confidence that it is accurate.

STATEMENT OF THE INVENTION

According to a first aspect of the present invention there is provided a system for distributing barcode information, the system including a plurality of terminal systems in communication with a database system, the database system including a database of item information related to a plurality of item identifiers representative of barcode information, where at least one of the terminal systems requests barcode information from the database system, the request including an item identifier representative of a barcode, and in response, the database system transmits barcode information associated with the requested item identifier to the at least one terminal system.

According to another aspect of the invention there is provided a method for acquiring barcode information from a base station system for use in updating or maintaining a local database of item information at a terminal system, wherein the base station system is in communication with the terminal system over a communications network and the base station system comprises a database server including a database of item information related to a plurality of base station item identifiers, the method including the steps of a) receiving at the terminal system at least one terminal item identifier, b) transmitting from the terminal system to the base station system an item request message, the item request message including the at least one terminal item identifier, c) receiving at the terminal system one or more packets of item information from the base station system if the at least one terminal item identifier corresponds with at least one of the plurality of base station item identifiers, the one or more packets of item information including a list of one or more item information related to the terminal item identifier, d) selecting from the list of one or more item information the most relevant item information for inclusion in the terminal system's local database.

According to another aspect of the invention there is provided a method of distributing barcode information to a terminal system from a base station system for use in updating or maintaining a local database of item information at the terminal system, wherein the base station system is in communication with the terminal system over a communication network and the base station comprises a database server including a database of item information related to a plurality of base station item identifiers, the method including the steps of a) receiving at the base station system an item request message from the terminal system, the item request message including at least one terminal item identifier, b) performing a search of the database of the base station system based on the terminal item identifier, c) compiling a list of one or more portions of item information related to the at least one terminal item identifier, d) transmitting one or more packets of the list of one or more portions of item information from the base station system to the terminal system.

The system, and methods of acquiring and distributing barcode information, and the terminal system and barcode base station system as described below provide the advantages of providing a central source of barcode information to terminal systems, which increases the efficiency and effectiveness of maintaining a terminal system's individual local database or inventory system. There is an increase in the accuracy of the barcode information and a decrease in data entry errors occurring and/or the complexity of a terminal system needing to import and convert non-standard database information from spreadsheets provided by multiple information suppliers. In addition, due to the centralised nature of the barcode base station system, more barcodes and barcode or product information are available to individual terminal systems or retailers, and the scanning and maintenance of their respective database inventories is faster and more accurate.

In another aspect of the invention there is provided a method of acquiring barcode information at a base station system for use in updating or maintaining a database server controlled by the base station system, the database server comprising a database of item information related to a plurality of base station item identifiers, wherein the base station system is in communication with one or more item information supplier systems over a communications network, the method including the steps of a) receiving at the base station system from at least one of the plurality of item information supplier systems a plurality of packets of item information, wherein the item information comprises one or more portions of item information associated with a corresponding supplier item identifier, b) comparing each received supplier item identifier with the plurality of base station item identifiers of the database, and performing the steps of, (i) updating the corresponding item information of the database with the received item information associated with the received supplier item identifier if there is only one match between the received item identifier and the plurality of base station item identifiers, (ii) selecting and updating the base station item identifier and the associated item information in the database that is most relevant to the received terminal item identifier and the associated received item information if there are a plurality of matches between the supplier and base station item identifiers, and (iii) inserting the received item information associated with the received supplier item identifier into the database.

Preferably the step of receiving further includes converting the received item information from a format specified by the item information supplier system to a format based on the item information stored in the database. Preferably the method further includes receiving at the base station system from at least one of a plurality of terminal stations one or more packets of item information, and performing method step (b) in relation to the one or more packets of item information received from the terminal station.

Preferably the base station system is in communication with one or more information server systems over the communications network, and the method further includes the steps of searching each of the information server systems over the communication network for item information related to each base station item identifier in the database, receiving at the base station system from at least one of the information server systems one or more packets of item information related to each base station item identifier if there is a match, and performing method step (b) in relation to the one or more packets of item information received from the at least one information server system.

An aspect of the invention further provides a terminal system for acquiring barcode information from a base station system for use in updating or maintaining a local database of item information at the terminal system, wherein the base station system is in communication with the terminal system over a communications network and the base station system comprises a database server including a database of item information related to a plurality of base station item identifiers, the terminal system including a) means for receiving at least one terminal item identifier, b) means for transmitting to the base station system an item request message, the item request message including the at least one terminal item identifier, c) means for receiving one or more packets of item information from the base station system if the at least one terminal item identifier corresponds with at least one of the plurality of base station item identifiers, the one or more packets of item information including a list of one or more item information from the base station database server related to the terminal item identifier, d) means for selecting from the list of one or more item information the most relevant item information for inclusion into the terminal system's database.

Preferably the means for receiving the terminal item identifier includes a scanner for scanning a representation of the terminal item identifier. Preferably, the means for receiving the terminal item identifier includes means for manually inputting the terminal item identifier into the terminal system.

A further aspect of the invention provides a base station system for distributing barcode information to a terminal system for use in updating or maintaining a local database of item information at the terminal system, wherein the base station system is in communication with the terminal system over a communication network and the base station system comprises means for controlling a database of item information related to a plurality of base station item identifiers, the base station system including a) means for receiving an item request message from the terminal system, the item request message including at least one terminal item identifier b) means for performing a search of the database of the base station system based on the at least one terminal item identifier, c) means for compiling a list of one or more portions of item information from the base station database related to the at least one terminal item identifier, d) means for transmitting one or more packets of the list of one or more portions of item information from the base station system to the terminal system.

In another aspect of the invention there is provided a base station system for acquiring barcode information at the base station system for use in updating or maintaining a database server controlled by the base station system, the database server containing a database of item information related to a plurality of base station item identifiers, wherein the base station system is in communication with one or more item information supplier systems over a communications network, the base station system including a) means for receiving from at least one of the plurality of item information supplier systems a plurality of packets of item information, wherein the item information comprises one or more portions of item information associated with a corresponding supplier item identifier, b) means for comparing each received supplier item identifier with the plurality of base station item identifiers of the database, and the means for comparing include (i) means for updating the corresponding item information of the database with the received item information associated with the received supplier item identifier if there is one match between the received supplier item identifier and the plurality of base station item identifiers, (ii) means for selecting and updating the database of the base station item identifier and the associated item information that is most relevant to the received supplier item identifier and the associated item information if there are a plurality of matches between the base station and supplier item identifiers, (iii) means for inserting the received item information associated with the received supplier item identifier into the database.

Preferably the base station system further includes means for receiving from at least one of a plurality of terminal stations one or more packets of item information, wherein the means for comparing is performed in relation to the one or more packets of item information and associated terminal item identifiers received from the terminal station.

Preferably, the base station system is in communication with one or more information server systems over the communications network and the base station further includes c) means for searching each of the information server systems for item information related to each base station item identifier of the database, d) means for receiving from at least one of the information server systems one or more packets of item information related to each base station item identifier if there is a match, wherein the means for comparing is performed in relation to the one or more packets of item information associated with the base station item identifier received from the at least one information server system.

In another aspect of the invention there is provided a system for storing and distributing barcode information including at least one base station system as described herein, at least one terminal system as described herein, and at least one information supplier server as described herein, wherein the at least one base station system is in communication over the communication network with the at least one terminal system and the at least one information supplier server. Preferably, the system further includes at least one information server as described herein, in communication with the at least one base station system over the communication network.

Other aspects of the invention provide computer readable mediums including program instructions stored thereon, which when executed on at least one processor of a terminal system and/or a base station system, performs the methods as described above, and as described herein.

The invention will now be further and more particularly described by way of example only and with reference to the accompanying drawings, in which:

FIGS. 1*a* and 1*b* illustrate alternative embodiments of a barcode information distribution system according to the invention.

DETAILED DESCRIPTION

Figure 1A:
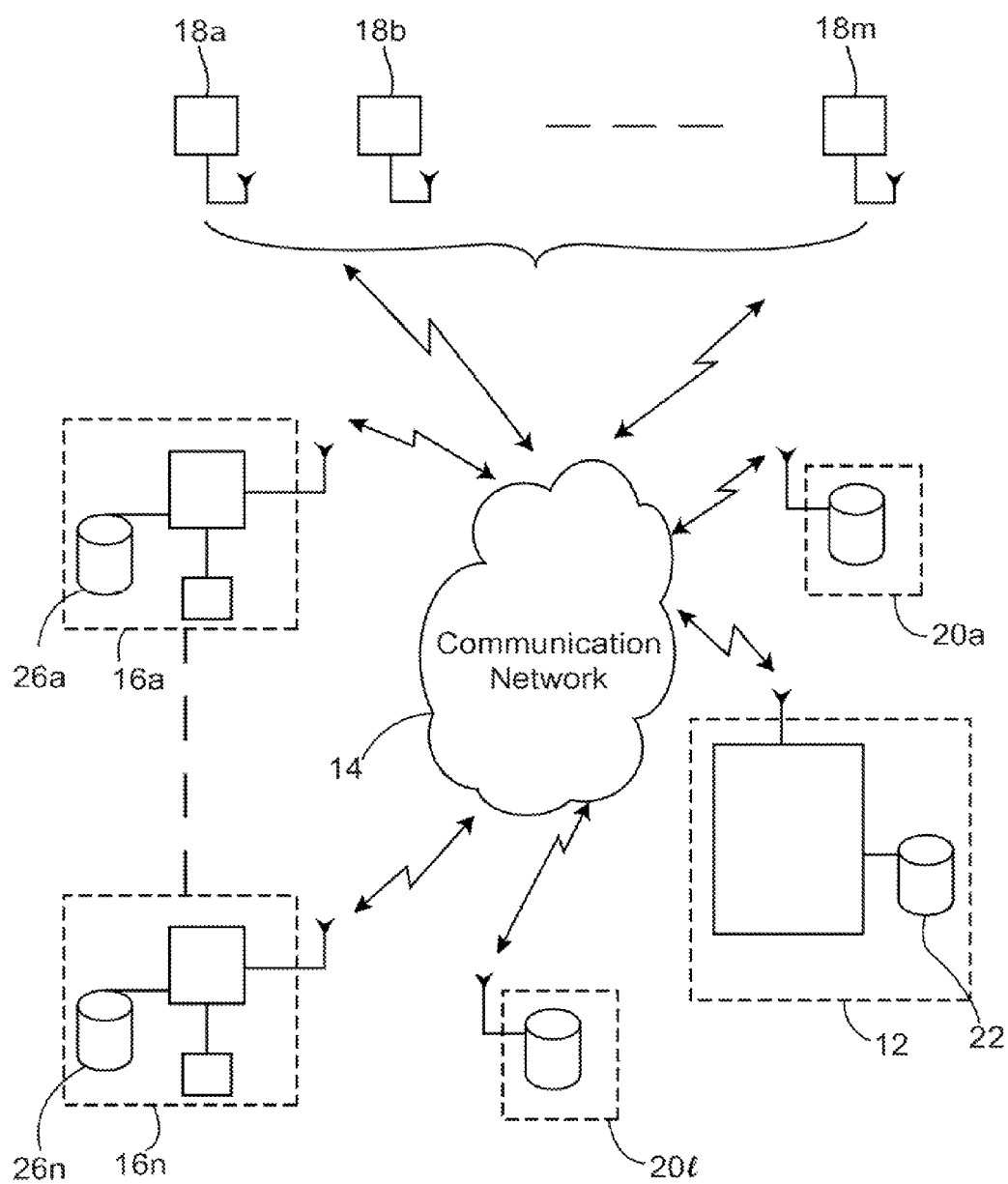
Figure 1B:
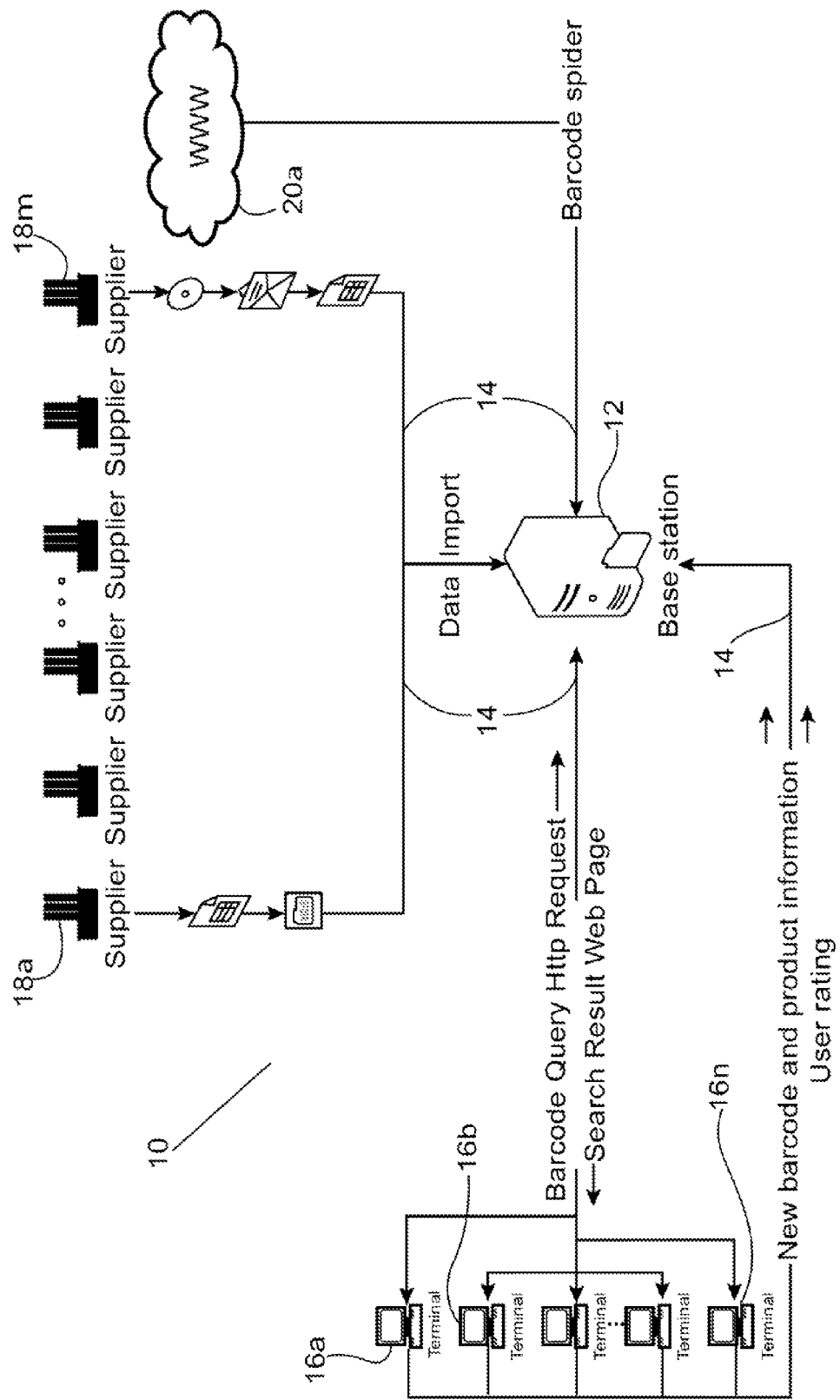

Referring to FIGS. 1*a* and 1*b*, a system 10 for distributing barcode information is illustrated. The system 10 includes a plurality of terminal systems 16*a* to 16*n* in communication with a database system 12, and the database system 12 includes a database 22 of item information related to a plurality of item identifiers representative of barcode information. At least one of the terminal systems 16*a* requests barcode information from the database system 12, the request including an item identifier representative of a barcode, and in response, the database system 12 transmits barcode information associated with the requested item identifier to the at least one terminal system 16*a*.

The system 10 can also be regarded as a barcode information distribution system 10, in which the distribution system 10 includes a base station system 12 in communication over a communications network 14 with one or more terminal systems 16*a* to 16*n*. The base station system 12 is also in communication over the communications network 14 with a plurality of item information supplier systems 18*a* to 18*m* and a plurality of content provider or information servers 20*a* to 20*l*.

The distribution system 10 stores and/or transmits barcode information and product or item information relating to product or item identifiers such as barcodes and the like to one or more of the terminal systems. Barcodes and other product identification type data as previously described, are herein referred to interchangeably as product or item identifiers. The product or item identifiers are also associated with product or item information and enhanced product and item information. This information is typically known as barcode information. Products or items that are inventoried can be labelled by manufacturers or suppliers with an item or product identifier (or barcode), which can be used to identify the product and associated information. Such information is the item or product type, model, quantity, colour, etc.

The item information and/or enhanced item information is acquired by the base station system 12 from various sources such as (a) barcode, product, or item information suppliers 18*a* to 18*m*, which include product suppliers, wholesalers, and/or manufacturers; (b) information servers 20*a* to 20*l*, which include internet search engines and providers and other knowledge or content servers and providers; and (c) one or more terminal systems 16a to 16n that can provide customised item information from database inventory systems of retailers or service providers. The item information and associated item identifiers are maintained and stored as records in a database of the base station system 12.

A terminal system 16a can request item information and enhanced item information from the base station system 12 for populating its local database 26a of its inventory management system and the like. The terminal system 16a sends one or more item identifiers (terminal item identifiers) to the base station 12 in the request message, and if any of the terminal item identifiers matches an item identifier stored in the base station system's database 22 (i.e. a base station item identifier), the base station 12 transmits a list of item information associated with the item identifiers to the terminal system 16a. The terminal system 16a can then select the most relevant item information for inclusion into its local database 26a.

Base Station System

In operation, the base station system 12 is configured to receive and store barcode-type data (or item identifiers) and associated product or item information, i.e. barcode information, via communications network 14, which can include the Internet or any other communications network. A terminal system 16a is configured to send a request message to the base station system 12 for requesting product or item information associated with an item identifier representative of barcode-type data (e.g. a barcode). The request message includes the item identifier.

On receiving the request message from the terminal system 16a, the base station system 12 performs a search procedure that determines the order in which to present any matching item identifiers (or barcodes) and the associated item information from the database server 22 of base station 12 to terminal system 16a.

The base station system 12 transmits a list of matching item or barcode information to the terminal system 16a, where the terminal system 16a selects the most relevant item information for inclusion into the terminal system's 16a local database server 26a.

The base station system 12 receives or acquires barcode information, which comprises barcodes or barcode-type data and associated item or product information, from external sources such as the information suppliers 18a to 18m, which can be wholesaler, suppliers, or manufacturers. In the case that one or more of the information suppliers 18a to 18m sends their barcode information in a proprietary format specific to each information supplier 18a to 18m, a bridging system (not shown in FIG. 1) is used to filter, format, modify, or standardize the received barcode information from the external sources so that it conforms with the base station format used for representing the barcode information (item identifier and associated item information and enhanced item information) in the base station system's database 22. In the case that external sources 18a to 18m supply barcode information in the correct format, then this information can be used to update the base station system's database 22 directly.

The bridging system modifies the barcode information coming from external sources so that it is compliant with the barcode information (item identifier and associated item information) format used by the base station system 12 and/or its database 22. The bridging system includes an integration or standardization framework that simplifies the exchange of information from suppliers in such a way that integration or standardization of the supplier's barcode information can be completed in essentially one operation. This is achieved using a file transfer protocol service to provide access to a secure location for the supplier 18a to send their barcode information to. Alternatively a supplier or item information supplier 18a can send the barcode information as an attachment in an email, e.g. the supplier 18a may provide a spreadsheet representative of all the barcode information that they have on record.

The bridging system polls this location (or a POP3 email server etc) and collects any barcode information present, which it interprets or standardises into base station barcode information or item identifier and associated item information compliant with the base station system's database 22. This information can be sent to the base station system 12 as barcode packets via the communication network 14. It is to be appreciated that the bridging system may an internal part of the base station system 12, such that the barcode packets can be sent on an internal communications network or a data bus of the base station system 12.

The bridging system allows item information suppliers 18a to 18m to provide barcode information in any format, i.e. a different or proprietary format, or even the required format accepted by the base station system 12, this maximises the chance of unifying the barcode information supplied by multiple information suppliers 18a to 18m in the database 22 of the base station system. The bridge system includes functionality to modify, if necessary, the supplied barcode information or packet structure to fit the requirements of barcode information that is compliant with the base station system 12. If the item information supplier's barcode information is found to be non-conformant, then the bridging system notifies the information supplier system 18a of non-acceptance of the data format in an exception notification message, allowing the item information supplier to modify their barcode information, or notify the bridging system of the type of barcode information format to expect so that the bridging system can convert the barcode information into a format compliant with that of the base station system 12.

The base station 12 also receives or acquires barcode information and/or product information and enhanced product information from further external sources such as information servers including barcode information from web or online servers and sources, for example search engines and related online databases. A barcode search engine is used to locate and draw down or retrieve barcode information from the other external sources. The barcode search engine will search servers containing online databases and other search engines for barcode information. When a barcode match is found, the associated barcode information is retrieved and communicated in a barcode information packet to the base station 12. This packet may also include information about the date, location and source of the information, which can be used in a priority or relevancy analysis of multiple barcode entries.

The base station system 12 also receives or acquires barcodes and associated barcode information from other external sources such as terminal systems 16a to 16n, retailers or inventory database systems, which allow users of the terminal systems 16a to 16n to transmit or feed new barcodes and associated barcode information and product or item information and enhanced product or item information and the associated product or item identifiers into the barcode base station database 22, which other terminal systems 16a to 16n can extract.

This allows a community of terminal systems 16a to 16n and users thereof to feed in and extract barcodes associated customised barcode information (or item identifiers and associated product and item information) into and out of the base station system's database 22. The base station system 12 may keep a points system (or a use metric or quality metric) that tracks statistics such as the number, quality, and/or accuracy of the barcode information (item identifiers and associated item information) input and output by individual terminal systems 16a to 16n and/or users thereof. This information may also be used in a priority or relevancy analysis of each of the barcodes and associated barcode information stored in the base station system's database 22.

A priority or relevancy analysis is performed at the base station system 12 to establish a best match priority or relevancy and orders the matching barcodes information (item identifiers and associated item information) into a list of barcode information or item information. The list is transmitted to the terminal system 16a to 16n.

Each portion of the barcode information is analysed in respect of the information included within it, which includes, but is not limited to, the number of fields actually populated within the portions of barcode information. The quality of the information contained in each portion of barcode information is analysed, alternatively the quality of the information is set within a field of the portion of information depending on the reliability of the information source. In the analysis, a feedback system can be used where the users of the terminal systems 16a to 16n rate the quality of the barcode packet or each portion of barcode information they receive. This feedback information is used to give a quality rating for each packet or barcode information, item information stored in the base station system's database 22, but also to related packets including other packets taken from the same location and other packets from the same supplier.

In another embodiment of the invention, base station system 12 is a database storage and communications system that stores item identifiers and associated item information including barcode information and forwards this information as barcode information packets or as a list of item information to terminal systems 16a to 16n. The barcode information or item information and packets derived therefrom may have the format as outlined in FIG. 2.

As indicated above, the barcode information is input to the base station system 12 though several different sources via a communications network. The communications network 14 may also include multiple sources connected to multiple base station systems 12. The network may include a local area network (LAN), a wide area network (WAN), a telephone network, such as the Public Switched Telephone Network (PSTN), an intranet, the Internet, a similar or dissimilar network, or a combination of networks.

The base station system 12 stores the received barcode information and indexes it accordingly, i.e. the item information is associated with a product or item identifier, such as a barcode. It is expected that the base station system 12 will receive or acquire multiple matching barcodes, which can be stored alongside each other with further separate identifiers distinguishing each multiple matching barcode.

As mentioned previously, the barcode field can be any standard form or barcode, including but not limited to EAN, UPC or other standard and non-standard form. In addition, 2D barcode information can be stored, RFID information can be stored as barcode or item identifiers. As such, the base station system 12 will respond to a multiple number of differently formatted item identifiers or barcodes, and hence will respond in the same way regardless of the barcode or item identifier payload of the request message.

The base station system 12 may include a bus, a processor, a memory, one or more input devices, one or more output devices, and a communication interface including a transceiver, receiver or transmitter. The bus permits communication among the components of the base station system 12. The processor may include any type of conventional processor or microprocessor that interprets and executes instructions. The memory may include a RAM or another type of dynamic storage device that stores information and instructions for execution by the processor; a ROM or another type of static storage device that stores static information and instructions for use by the processor; and/or some other type of magnetic or optical recording medium and its corresponding drive. The communication interface may include any transceiver-like mechanism that enables the base station system 12 to communicate with other devices and systems via the communications network.

The base station system 12 performs certain searching-related operations, for example database search operations or web based search operations, in response to the processor executing software instructions contained in a computer-readable medium, such as memory. The software instructions may be read into memory from another computer-readable medium or from another device via the communication interface. The software instructions contained in memory causes processor to perform procedures that will be described later. However, alternatively, hardwired circuitry may be used in place of or in combination with software instructions to implement processes consistent with the present invention. Thus, the present invention is not limited to any specific combination of hardware circuitry and/or software.

Terminal System

In operation, a terminal system 16a requests barcode information or item information associated with an item identifier from base station system 12. The terminal system 16a can be triggered by a barcode scanning device, or by manual input of a barcode, product, or item identifier into the terminal system 16a. Alternatively, the item identifier can be provided by RFID technology or any other technology related to automatic identification systems as previously mentioned.

The terminal system 16a then transmits an item request message or packet along with at least one barcode or item or product identifier to the barcode base station 12. As mentioned above, the barcode base station 12 returns any matching barcode information associated with the barcode identifier in the request message. The barcode base station 12 also provides the terminal system 16a with information relating to the priority order or order of relevance of the matching barcode information (item information), which is determined by the priority or relevancy analysis and search procedure. The terminal system 16a selects from the matching barcode information (item information) the most relevant or highest priority barcode information for updating a similar record or for inclusion in the local database 26a.

The terminal system 16a may include a bus, a processor, a main memory, a read only memory (ROM), a storage device for storing one or more barcode identifiers and associated bar code information, one or more input devices, one or more output devices, and a communication interface. The bus may include one or more conductors that permit communication among the components of the terminal system 16a. The processor may include any type of conventional processor or microprocessor that interprets and executes instructions. The main memory may include a random access memory (RAM) or another type of dynamic storage device that stores information and instructions for execution by the processor. The ROM may include a conventional ROM device or another type of static storage device that stores static information and instructions for use by the processor. The storage device may include a magnetic and/or optical recording medium and its corresponding drive.

The input devices for inputting barcode or item identifiers may include one or more conventional mechanisms that permit a user to input barcode information to the terminal system 16a. These may be, for example, a barcode scanner, 2d barcode scanner, RFID reader or other product tag identifier than can be read by a device for the purposes of product identification, or a manual input device such as a keyboard or numeric keypad.

The output devices may include one or more conventional mechanisms that output information to the user, including a display, a printer, a speaker, etc. The communication interface may include any transceiver-like mechanism that enables the terminal system 16a to communicate with other devices and/or systems. For example, the communication interface may include mechanisms for communicating with another device or system via the communications network 14.

The terminal system 16a will store the barcode information in its storage system, which includes a local database 26a of barcode identifiers and associated barcode information, as barcode packets or records. The local database 26a is searched first before any requests for barcode information are transmitted from the terminal system 16a. When the terminal system 16a scans a barcode, item identifier, or other product tag, it will send the request for barcode or item information to the local database 26a. If this local database 26a does not have a match for the barcode or item identifier then the terminal system 16a transmits a request message or packet to the base station system 12 to request barcode information associated with a barcode or item identifier sent in the request message. The barcode information is transmitted from base station system 12 in one or more packets for the given barcode via the communications network.

The base station system 12 can respond with no matches, or one or more matches for a requested barcode or item identifier. If there are one or more matches then a list of the one or more barcode information associated with the matches or packets can be displayed on the terminal system 16a allowing a user to select the appropriate barcode information in relation to the request message. The barcode information may be displayed as hyper-links in a web page format allowing the user to make a selection using a mouse pointer, pen, touch screen, or any other input device.

Alternatively, only a summary outline of the barcode information associated with the one or more matches is retrieved from the base station system 12 and displayed. The terminal system 16a detects the link selection and retrieves the corresponding barcode information or barcode packet from the barcode base station 12 and the terminal system 16a stores the barcode information in the local database 26a or its storage system. The user of the terminal system 16a may alter or override any settings/fields of the barcode information or packet to fit their requirements.

The barcode information or barcode packet quality transmitted from the base station system 12 is checked against that of the terminal system 16a. If the quality of the barcode information in the base station system is determined to be better, then an option is given to the user of the terminal system 16a to overwrite the barcode information in the local database 26a. Another option can allow the user of the terminal system 16a to select certain fields of the barcode information to overwrite.

Terminal/Barcode System Procedures

Figure 3:
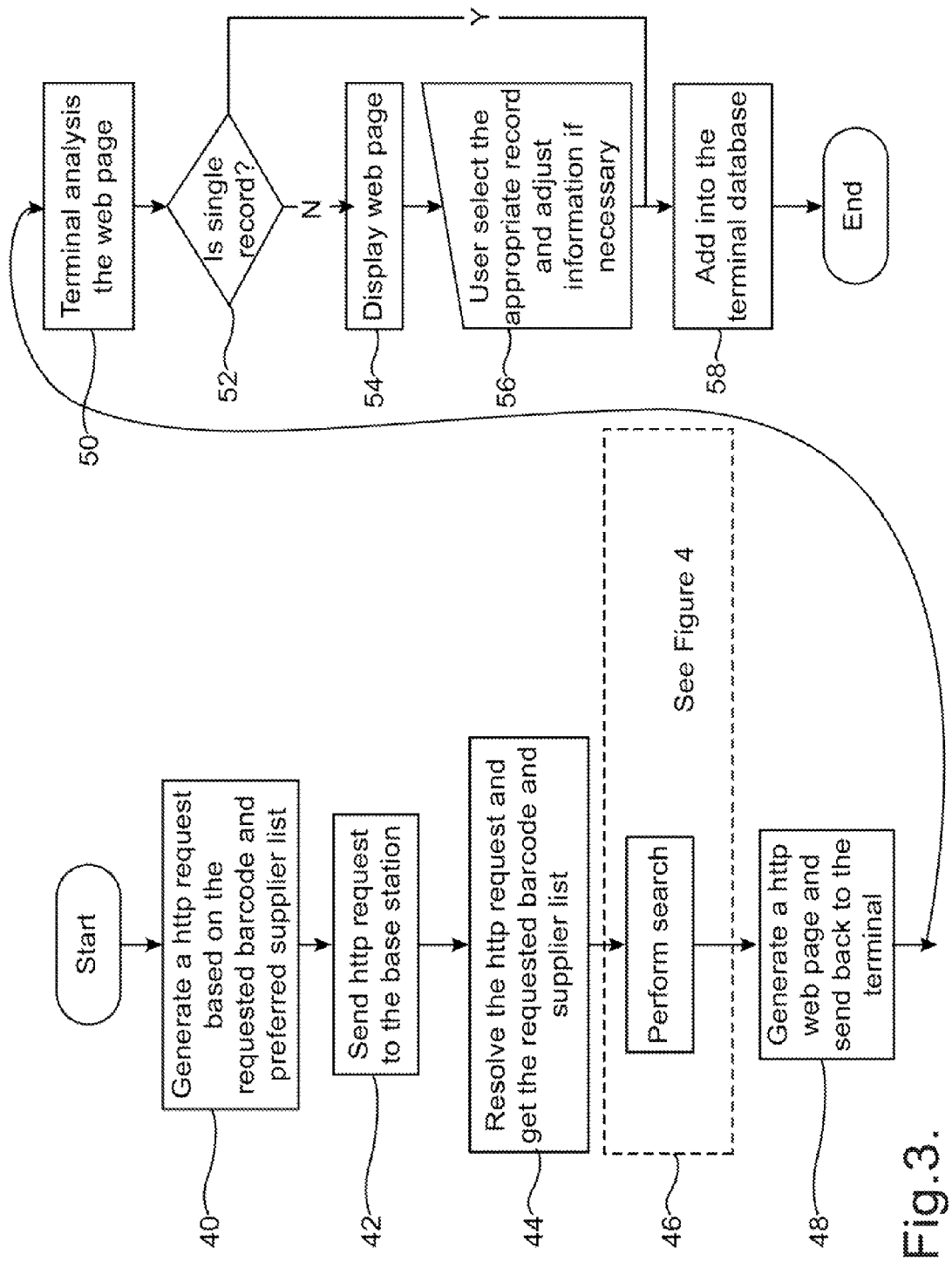
FIG. 3 illustrates the barcode query protocol between the base station system and one or more terminal systems.

Referring to FIG. 3, there is provided a procedure for distributing barcode information (including item information and associated item identifiers) from a base station system to a terminal system. In step 40, the terminal system generates an http request based on the requested barcode or item identifier and preferred supplier list. It is to be appreciated that the barcode request message need not be an http request message, other message formats and means for communicating the barcode and preferred supplier data from the terminal system to the base station system may be used. Although a preferred supplier list is included in this example, these lists need not be included. The preferred supplier list may have been transmitted separately to the base station system 12 and stored there and associated with a profile of the terminal system, so any request message only containing an item identifier (or barcode) then the base station system can refer to the list of preferred suppliers. However, it is recognised that if barcode and associated barcode information is entered into the base station system based on information from a preferred supplier, then the item information stored in the base station system is considered to be the most accurate and reliable information.

In step 42, the http request is sent to the base station system. In step 44, the base station system resolves the http request and gets or extracts the requested barcode and supplier list. In step 46 the base station performs search and result processing of the barcode and preferred supplier list, for more details refer to FIG. 4. In step 48, the base station system generates an http web page and sends or transfers it back to the terminal. In step 50, the terminal system performs a terminal analysis of the web page. In step 52, the terminal system determines whether the results of the search and web page include a single record. If there are multiple records, then in step 54 the terminal system displays the web page and allows a user or operator to select the most appropriate record and adjust the information if necessary. In step 58, the selected and/or adjusted record is added or inserted into the terminal system's local database. In step 52, if the terminal system determines that the results of the search and web page include a single record, then the procedure allows the user or operator to adjust the information as necessary and/or performs step 58 and adds the record into the terminal system's local database.

The terminal/base station distribution procedure then starts again when another barcode or list of barcodes is scanned/entered into the terminal system and a request is generated.

Barcode Information Packet

Figure 2:
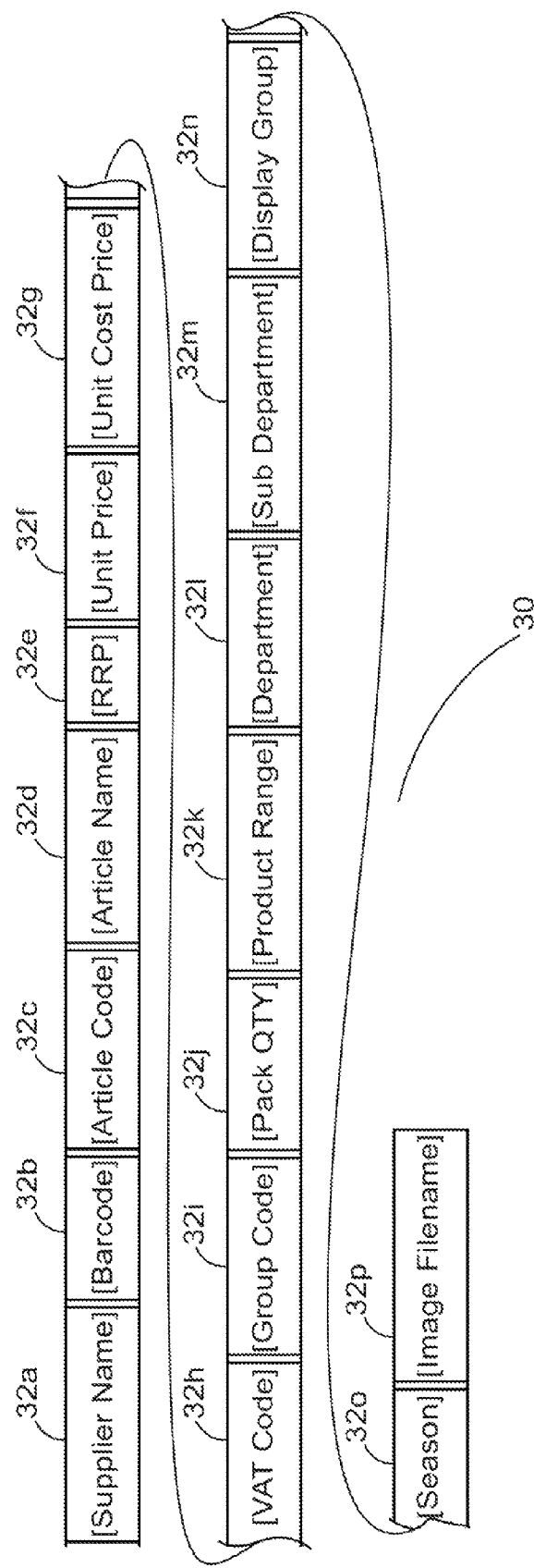
FIG. 2 illustrates the data fields that may be included in item information associated with an item identifier or sent in a barcode packet from the base station system to the terminal system.

Referring to FIG. 2, there is illustrated a packet of item information 30 (or a barcode information packet) that is associated with a corresponding item identifier (or barcode and the like). The packet of item information 30 includes item information represented by data fields 32a to 32p, and it is this data representing at least a portion of the records defining the item information within the base station system's database 22 that can be transmitted in the list of item information from the base station system 12 to the terminal system 16a.

The item information packet 30 includes the data fields, Supplier Name 32a, Barcode or other product or item identifier 32b, Article Code 32c, Article Name 32d, Recommended Retail Price 32e, Unit Price 32f, Unit Cost Price 32g, VAT Code 32h, Group Code 32i, Pack Quantity 32j, Product Range 32k, Department 32l, Sub Department 32m, Display Group 32n, Season 32o, and Image Filename 32p. Other fields or data that may be included are an actual representation of the image identified by the Image Filename, i.e. in a image format such as JPEG, BMP, or TIFF imaging format and the like. It is to be appreciated that the barcode information packet 30 may comprise any other combination of these fields, or any other field relating to product or item information associated with an item identifier that is useful for the users of the terminal system 16a. In addition, it is to be appreciated that the terminal system 16a may request only a subset of these fields, or different data fields that the base station system 12 might also store within the database 22 that is associated with the item information and data fields of the packet of item information 30.

Search and Result Processing Procedure

Figure 4:
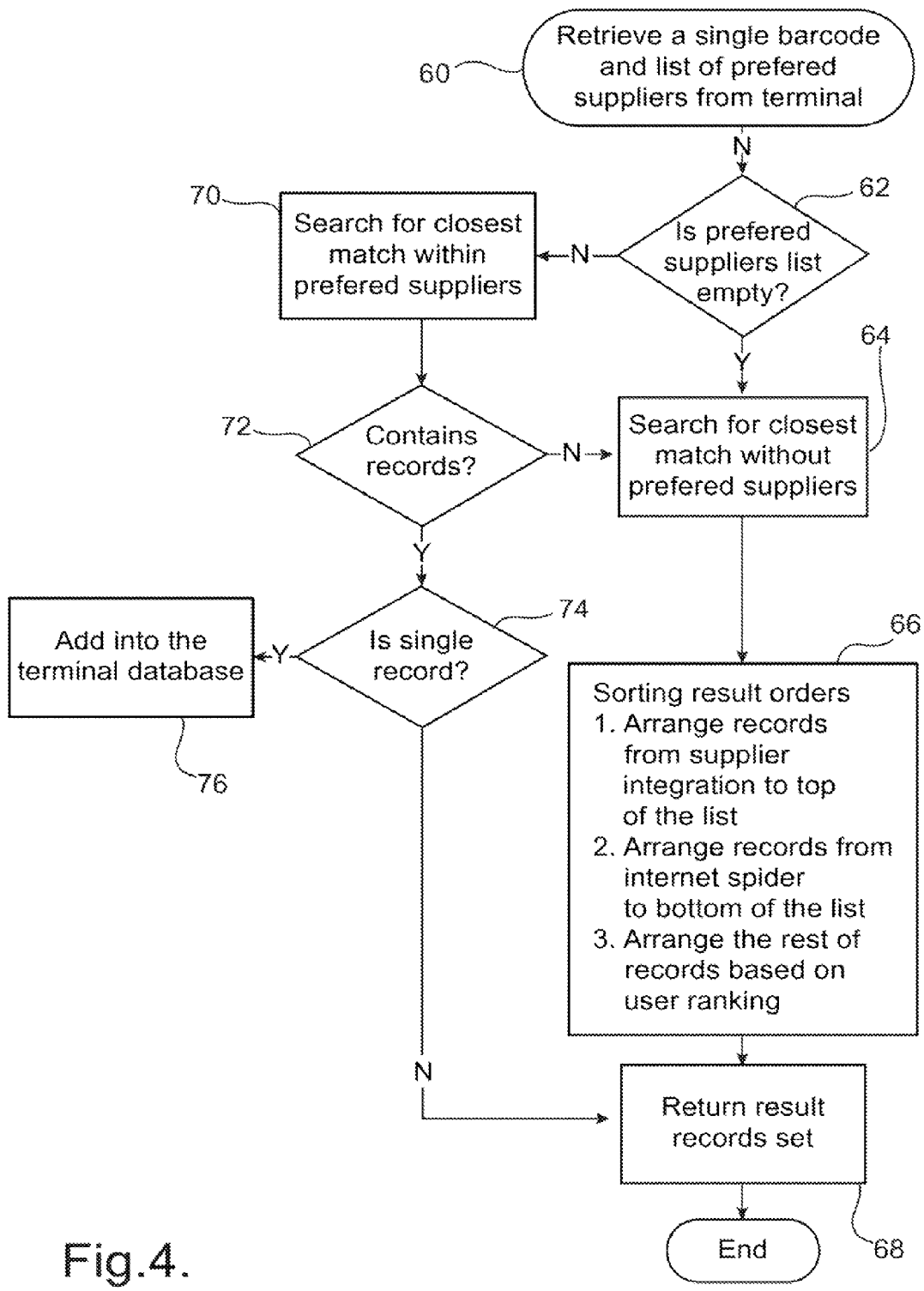
FIG. 4 illustrates the operation of the base station system providing a list comprising one or more portions of barcode information after receiving a request for barcode information from a terminal system.

Referring to FIG. 4, there is illustrated an embodiment of a search and result processing procedure that is performed by the base station, in response to receiving an http request from the terminal system, the http request message being based on a requested barcode and/or preferred list of suppliers. In this example, a single barcode and list of preferred suppliers is retrieved at step 60 from the http request message. However, it is to be appreciated that one or more barcodes or a list of barcodes could also be retrieved from a request message, or an http request message, or any other messaging format may be used to communicate this information. In step 62, the base station system determines if a list of preferred suppliers is detected or included in the request message, and if it is included, the base station system also determines whether the list of preferred suppliers is empty or not.

If the preferred suppliers list is empty, then the procedure moves to step 64 and search is performed on the barcode or barcode list for the closest matching barcode and associated barcode information stored at the base station system (e.g. stored in a database of barcodes and associated barcode information) without the preferred list of suppliers. The result list contains records of each of the one or more matching barcodes and associated barcode information.

At step 66, the base station system sorts the result list by arranging the records (e.g. each matching barcode and associated barcode information) in the following order of priority (from highest to lowest):

1. Records stored in the base station system from supplier information (i.e. from supplier uploaded files and images);
2. Records stored in the base station system as a result of searching external sources such as online servers and the internet using automatic web searches, web agents and/or an internet spider, and the like.
3. The remaining stored records, based on reliability ranking results either input by users of terminal systems or as determined by the base station system by a qualitative analysis or a moderator of the system.

The result records are sorted according to the above priority ranking and then in step 68 they are returned to the base station system, which generates an http web page based on the result list and sends this back to the terminal system. Alternatively, other file formats, or data formats can be used to send or transmit the result list (containing priority sorted matching barcodes and associated barcode information) back to the terminal system.

In step 62, if it is determined that the preferred suppliers list is empty or if it was not transmitted or included in the request message, then the procedure moves to step 70 where a search is performed, based on the received barcode, for the closest matching barcode(s) and associated barcode information from the preferred list of suppliers. The result list provides the list of records (i.e. barcodes and associated barcode information) of the matching barcodes. However, in step 72 it is determined whether the result list is empty, and if so, the procedure moves onto step 64. Otherwise the procedure moves onto step 74.

In step 74, if it is determined that there is a single record in the result list, then this record is set to be transferred to the terminal system in step 76. However, if is determined in step 74 that more than one record is returned from the search, then the procedure moves to step 68 where the list of result records from the preferred list of suppliers is then set to be transferred from the base station system to the terminal system. The procedure then continues onto step 48 of FIG. 3.

Base Station System Bridging Import/Acquisition Procedure

Figure 5:
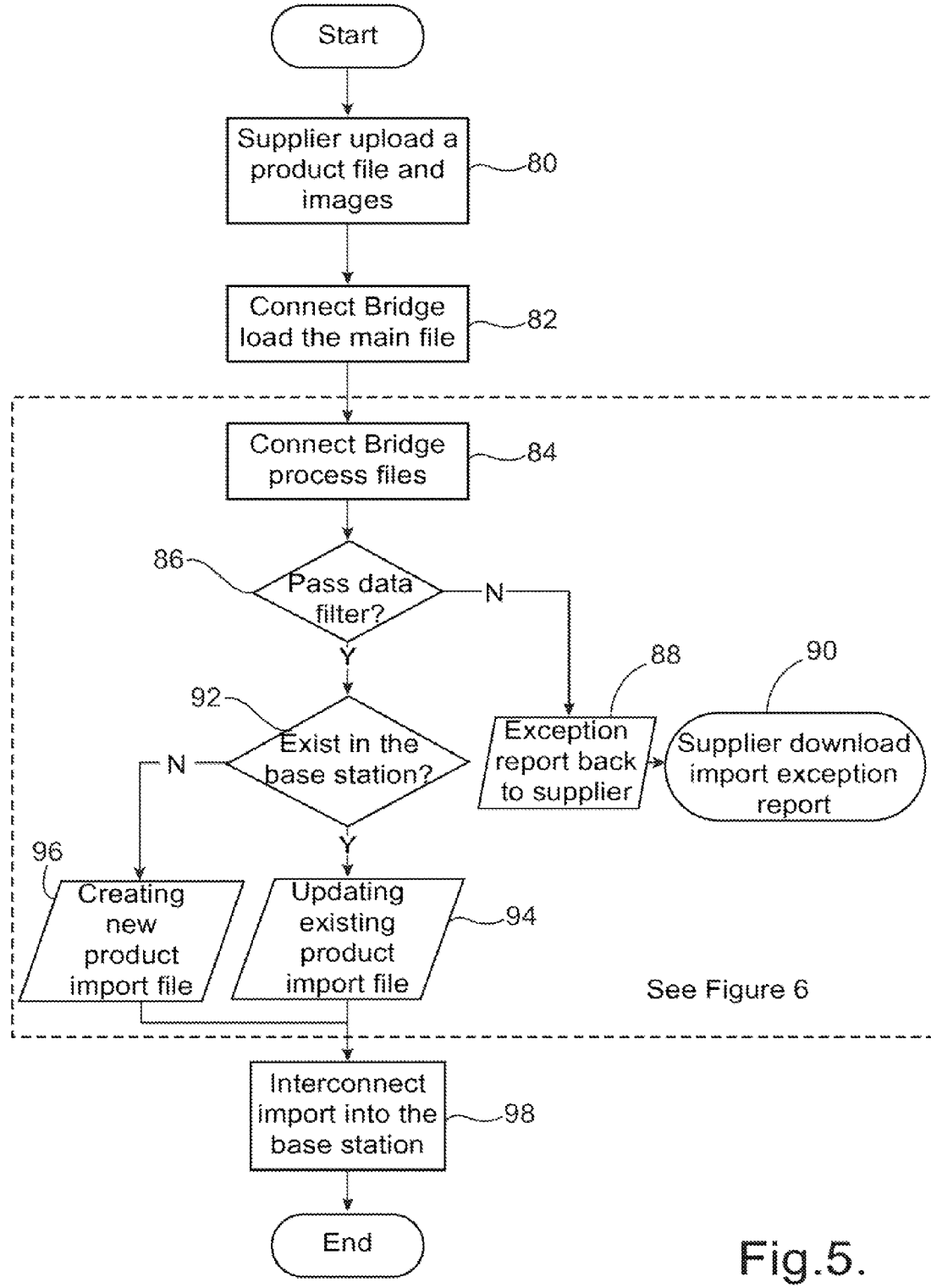
FIG. 5 illustrates the steps taken for the base station system to acquire barcode information from multiple information suppliers.

Referring to FIG. 5, there is illustrated an embodiment of an acquisition procedure for the base station system to acquire barcodes and associated barcode information from reliable suppliers (item information suppliers) and the like. In step 80 each of the suppliers uploads a product file and associated images to a connecting bridging system, which may be a component of the base station system or a separate entity to the base station system. In step 82, the connecting bridging system then loads the main files for processing. In step 84 the connecting bridging system processes the files uploaded from each of the suppliers to determine whether the files and associated images can be filtered into a barcode and barcode information format that is compliant with the base station system.

In step 86 if the uploaded files are found to be non-compliant, then the procedure moves to step 88 where an exception report is generated for the supplier, and in step 90 the supplier may download and import the report for further analysis. The supplier can then examine why their uploaded files and images failed to comply with the base station system and update the corresponding files and images accordingly. In step 86, should the files and image files be found to be compliant with the barcode and barcode information of the base station system, then the procedure continues to step 92 where the connecting bridge system determines if the barcode and barcode information supplied in the uploaded files exists in the base station system, i.e. on the database of the base station system.

In step 92, if the barcode information does exist in the base station system, then the procedure continues to step 94 where, since existence of the barcode information means an existing product import file also exists, the existing product import file for that information supplier is then updated.

In step 92, if the barcode information does not exist in the base station system, then the procedure continues to step 96, where a new product import file is created and stored in the bridging system. In step 98, the resulting product import files that are considered to be compliant for entering/updating barcode and barcode information into the base station system are imported from the bridging system to the base station system. That is, the base station system updates/stores and/or enters the barcode and associated barcode information it can extract from the imported product files into the base station system's database of barcodes and associated barcode information.

Importing/Acquisition Procedure

Figure 6:
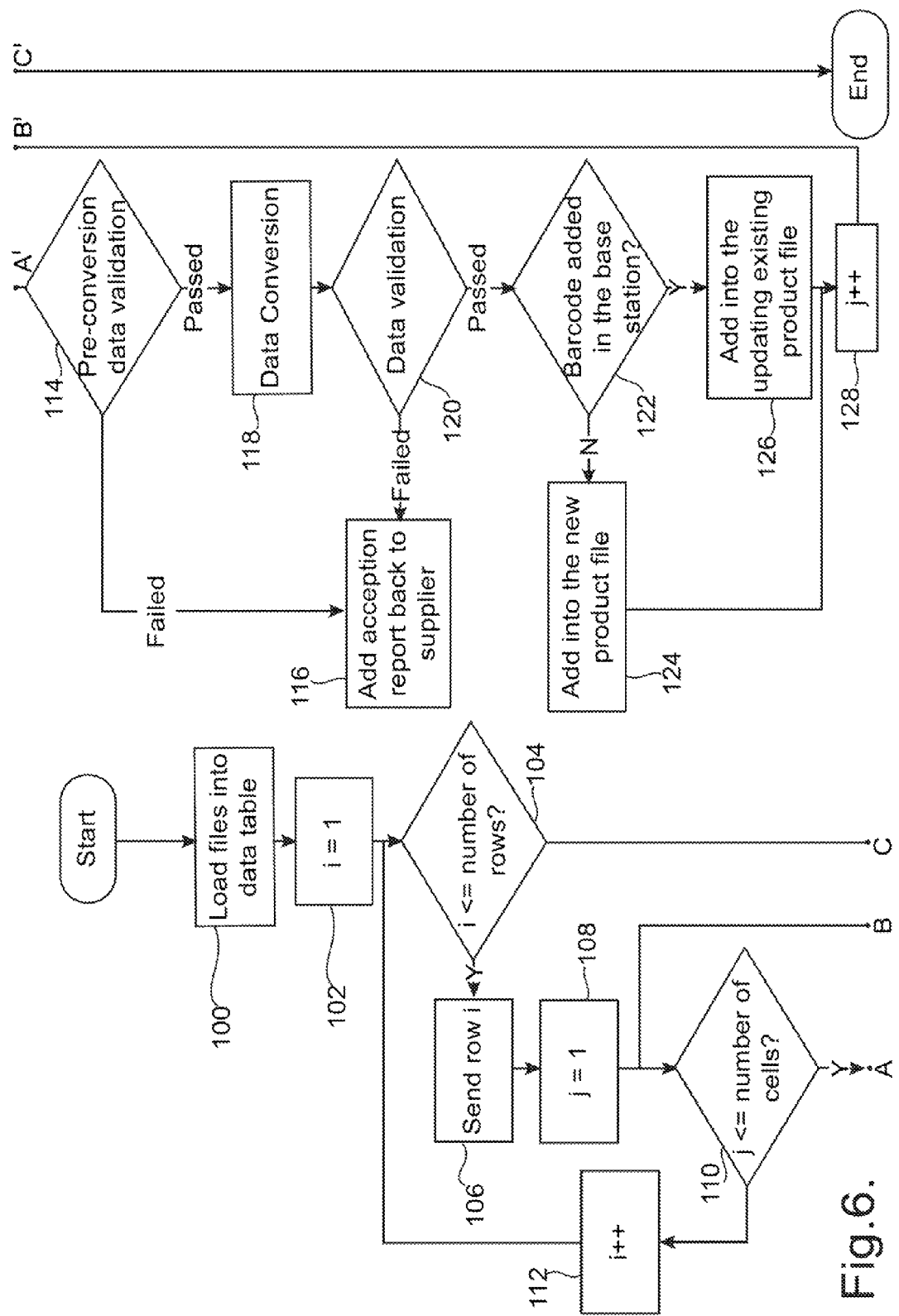
FIG. 6 illustrates a bridge system for receiving and/or converting barcode information provided by one or more information suppliers or external sources.

Referring to FIG. 6, there is illustrated an implementation of the acquisition and import procedure outlined in the dashed box of FIG. 5. After the product file and images from the supplier have been uploaded into the connecting bridge system as in steps 80 and 82 of FIG. 5, then in step 100 the files are loaded into a data table, where it is determined that the data table has N rows and M columns of data cells. A row of the data table represents a barcode's associated barcode information—i.e. product information where each field of product information is represented by a data cell.

In step 102, a row counter, i, is initialised to 1 so that i=1. In step 104, if i is less than or equal to N, then the procedure continues to step 106, where the data cells that make up row i of the data table is sent to be analysed for compliance with the data format accepted by the base station system.

The analysis of row i begins at step 108 where a column or cell counter, j, is initialised to 1 so that j=1. In step 110, if j is greater than the total number of cells or columns per row, then the analysis for row i is complete and in step 112 the number of rows i is incremented, and the procedure proceeds back to step 104 of comparing whether the number of rows i is less than or equal to N.

In step 110, if j is less than or equal to the number of cells or columns per row, then the procedure continues from label A to label A', where in step 114 it is determined whether the data in cell j is validly compliant with the corresponding data accepted by the base station system. This is a preconversion data validation test. In step 114, if the pre-conversion data validation test failed, then the procedure continues to step 116, where an exception is added to the exception report, which is (or will be) sent back to the supplier for review and analysis when the acquisition/import process is completed.

In step 114, if the pre-conversion data validation test passed, then the procedure continues to step 118, where data conversion is performed to ensure the data cell is compliant with the data accepted by the base station system. In step 120, if the data conversion fails, then the procedure continues to step 116, where an exception is added to the exception report, which will be sent back to the supplier for review and analysis when the acquisition/import process is completed.

In step 120, if it is determined that the data in cell j is compliant with the base station system, then the procedure continues to step 122, as the data validation is considered to have been passed. In step 122, it is determined whether the barcode associated with data cell j exists within the data stored in the database managed by the base station system. In step 122, if the barcode does not exist, then the procedure continues to step 124 where a new product file is created for including the barcode and the data associated with the barcode, i.e. the data from cell j. In step 122, if the barcode does exist, then the procedure continues to step 126, where the existing product file related to the barcode is updated with data cell j. In step 128, the column or cell counter j is then incremented and the procedure proceeds from label B' to label B, where in step 110, it is determined whether the column or cell counter j is less than the total number of columns or cells M. The procedure then continues until all of the cells or columns in a row i have been analysed.

Once all of the rows i of the data table have been analysed, in step 104, if it is determined that i is greater than the total number of rows N, then the acquisition/import procedure moves from label C to label C' which ends the data conversion/validation procedure. The procedure then proceeds to step 98 of FIG. 6, which is the step of importing or transferring the product files that have been updated and created to the base station system for maintaining the base station system's database of barcode and associated barcode information.

Other Examples and/or Modifications

Another example of the base station system 12 and procedures performed by the base station system 12 is provided with reference to FIG. 1. The base station system 12 can include procedures or operations for acquiring barcode information at the base station system 12 for updating or maintaining a database 22 controlled by the base station system 12. The database 22 includes a database of barcode information or item information related to a plurality of base station item identifiers representative of the barcode information. The base station system 12 is in communication with one or more item information supplier systems 18a to 18m over a communications network 14.

The procedure includes receiving at the base station system 12 from at least one of the plurality of item information supplier systems 18a to 18m a plurality of packets of item information or barcode information, wherein the item information or barcode information includes one or more portions of item information associated with a corresponding supplier item identifier (e.g. the supplier's supplied barcode). The received supplier item identifiers are compared with the plurality of base station item identifiers (item identifiers stored at the base station 12) of the base station system's database 22. The following operations are performed for evaluating and entering the supplied item information into the base station system's database. The base station system 12 updates the corresponding item information of the database 22 with the received item information associated with the received supplier item identifier if there is only one match between the received supplier item identifier and the plurality of base station item identifiers. The base station system 12 selects and/or updates the base station item identifier and the associated item information in the database 22 that is most relevant to the received terminal item identifier and the associated received item information if there are a plurality of matches between the supplier and base station item identifiers. Otherwise, the base station system 12 inserts the received item information associated with the received supplier item identifier into the database 22.

The base station system 12 or an external entity such as a bridging system can convert the received supplier item information from a format specified by the item information supplier system to a format based on the item information stored in the database of the base station system. The base station system 12 or the external entity can receive item supplier information by the at least one of the item information supplier systems uploading the received supplier item information to the bridging system and/or the base station system. The base station system 12 can also receive a portion of the supplier item information from at least one of the item information supplier systems directly uploading the received supplier item information to the base station system 12 or bridging system. The procedure of receiving can also include receiving an email message including a portion of the supplier item information sent from at least one of the item information supplier systems 18a to 18m. The item information or barcode information can also be supplied as a product information file (data file) or as a data file representative of a spreadsheet of item information or barcode information.

The base station system 12 can also be in communication with a plurality of terminal systems 16a to 16n over the communication network 14. Hence the base station system 12 can include the operations of receiving at the base station system 12 from at least one of the terminal systems 16a to 16n one or more packets of terminal item information. The base station system 12 also performs the comparing and database updating and insertion operations as previously described, but with respect to the received one or more packets of terminal item information.

The base station system 12 can also be in communication with one or more information server systems 20a to 20l over the communication network 14. Hence the base station system 12 can include the operations of performing a search of at least one of the information server systems 20a over the communication network 14 for item information related to at least one of the base station item identifiers stored in the database 22 of the base station system 12. The base station system 12 also receives from at least one of the information server systems 20a to 20l one or more packets of item information related to the at least one base station item identifier if there is a match. The base station system 12 also performs the comparing and database updating and insertion operations as previously described, but with respect to the one or more packets of item information received from the at least one information server system 20a.

The base station system 12 also performs a ranking of the received item information. The received item information is ranked as 1) high priority data if the source of item information is from at least one of the item information supplier systems 18a to 18m, or 2) medium priority data if the source of item information is from at least one information server system 20a to 20l, and 3) low priority if the source of item information is from at least one of a plurality of terminal systems 16a to 16n.

It is to be appreciated that this ordering could be changed based on terminal system user feedback to the base station system 12 based on what they consider the quality or accuracy, or usefulness of the item information transmitted in the lists of item information from the base station system 12 to the corresponding terminal system 16a.

The base station system 12 distributes barcode information (or lists of item information and associated item identifiers) to a terminal system 16a from the base station system 12 for use in updating or maintaining a local database 26a of item information at the terminal system 16a. The base station system 12 is in communication with the terminal system 16a over a communication network 14 and the base station system 12 comprises a database server including a database 22 containing records of item information related to a plurality of base station item identifiers, which are representative of barcode information.

The base station system 12 begins the operation of distributing the barcode information when it receives an item request message from the terminal system 16a, the item request message including at least one terminal item identifier, i.e. the item identifier input at the terminal system 16a by a user. This item identifier can be representative of barcode-type data as previously described.

Once the base station system 12 receives the item request message, it performs a search of the database 22 based on the terminal item identifier to retrieve, if there is a match between at least one of the base station item identifiers (this barcode-type data that is stored at the base station system's database 22, which may correspond with the terminal item identifier) and the at least one terminal item identifier, one or more records of item information associated with the at least one terminal item identifier.

The base station system 12 then compiles or creates a list of the retrieved item information related to the at least one terminal item identifier. This list of information is then transmitted or sent in one or more packets of item information from the base station system 12 to the terminal system 16a for inclusion of item information selected from the transmitted list of item information into the local database 26a.

The item request message can also include a list of preferred information suppliers, and hence the search operation performed at the base station system 12 can also include performing the search of the database 22 based on the list of preferred suppliers and the terminal item identifier. Alternatively, the base station system 12 may store the list of preferred suppliers supplied by the terminal system 16a in a profile reserved for the terminal system 16a, and the search operation further includes performing the search of the database based on the list of preferred suppliers and the terminal item identifier. This limits the search to only those suppliers the terminal system 16a is interested in.

The operation of compiling or creating the list of item information further includes sorting the list of item information according to a ranking based on where the one or more records of item information stored in the database 22 of the base station system 12 is sourced from. This may be performed, for example, by ranking the list of item information from a higher priority if the source of item information is an item information supplier system 18a, to a lower priority if the source of item information is from at least one of a plurality of terminal systems 16a to 16n. The list of item information can be ranked at a medium priority if the source of item information is retrieved from an external information server 20a. However, it is to be appreciated that the list of item information can be ranked in another priority or relevancy order that is specified by the terminal system 16a or by feed back from terminal systems based on the perceived quality of the lists of item information supplied by the base station system 12.

A terminal system 16a of the distribution system 10 can acquire barcode information from the base station system 12 for use in updating or maintaining a local database 26a of item information at the terminal system 16a. The terminal system 16a is in communication with the base station system 12 over a communication network 14. The terminal system 16a receives at least one terminal item identifier, or item identifier based on barcode-type data. As an example, the item identifier can typically be entered into the terminal system 16a by the user on receiving a pallet of products or items from a supplier. The terminal system 16a then transmits to the base station system 12 an item request message that in includes at least one terminal item identifier. This is typically, after the user of the terminal system 16a needs to retrieve further product or item information relating to the received products or items. The item request message is used to request, from the base station system 12, item information associated with the item identifiers included in the request message.

The terminal system 16a then receives one or more packets of item information from the base station system 12 if the at least one terminal item identifier corresponds with at least one of the plurality of base station item identifiers, the one or more packets of item information including a list of one or more item information related to the terminal item identifier. The operation of the base station system 12 on receiving the item request message has already been described. The terminal system 16a then selects from the list of one or more item information the most relevant item information for inclusion in the terminal system's local database 26a. The terminal item identifier can be scanned from a representation of the terminal item identifier using barcode reader or optical reader, and the like, or even transmitted to the terminal system 16a from an RFID tag and the like. Alternatively, a representation of the terminal item identifier may be manually input into the terminal system 16a, e.g. by numeric keypad, mouse, touch screen input, or a keyboard or any other input device.

The item request message can further include a list of preferred information suppliers for use in retrieving the list of item information from the database of the base station system 12. The received list of item information can be sorted according to a ranking based on where the one or more records of item information stored in the database of the base station system is sourced from as has already been described above with respect to the base station system 12.

The distribution system 10 is for storing and distributing barcode information or item information and associated item identifiers, the distribution system 10 includes at least one base station system 12 that includes any of the features so far described in respect of the base station system 12, at least one terminal system 16a that includes any of the features so far described in respect of the terminal system 16a, and at least one information supplier system 18a that includes any of the features so far described in respect of the information supplier system 18*a*, where the at least one base station system 12 is in communication over the communication network 14 with the at least one terminal system 16*a* and the at least one information supplier system 18*a*. The system can further include at least one information server 20*a* that includes any of the features so far described in respect of the information server 20*a*, which is also in communication with the at least one base station system over the communication network 14.

Although individual embodiments, examples, and/or modifications of the invention are discussed, it is to be understood that combinations of the above-mentioned features, examples, modifications, and/or individual embodiments also fall within the scope of the invention as claimed and described.

The invention claimed is:

1. A method of acquiring barcode information at a base station system for use in updating or maintaining a database server controlled by the base station system, the database server comprising a database of item information related to a plurality of base station item identifiers representative of barcode information, wherein the base station system is in communication with one or more item information supplier systems over a communications network;

the method comprising the steps of:
a) receiving at the base station system from at least one of the plurality of item information supplier systems a plurality of packets of item information, wherein the item information comprises one or more portions of item information associated with a corresponding supplier item identifier; and
b) comparing each received supplier item identifier with the plurality of base station item identifiers of the database, and performing the steps of:
  (i) updating the corresponding item information of the database with the received item information associated with the received supplier item identifier if only one match is found between the received supplier item identifier and the plurality of base station item identifiers;
  (ii) selecting and updating the base station item identifier and the associated item information in the database that is most relevant to the received terminal item identifier and the associated received item information if a plurality of matches are found between the supplier and base station item identifiers; and
  (iii) inserting the received item information associated with the received supplier item identifier into the database.

2. The method of claim 1, wherein the step of receiving further comprises converting the received supplier item information from a format specified by the item information supplier system to a format based on the item information stored in the database of the base station system.

3. The method of claim 1, wherein the step of receiving further comprises at least one of the item information supplier systems uploading the received supplier item information to a bridging system of the base station system.

4. The method of claim 1, wherein the step of receiving further comprises receiving a portion of the supplier item information from at least one of the item information supplier systems by directly uploading the received supplier item information.

5. The method of claim 1, wherein the step of receiving further comprises receiving an email message including a portion of the supplier item information sent from at least one of the item information supplier systems.

6. The method of claim 1, wherein the item information is supplied as a product information file or as a data file representative of a spreadsheet of item information.

7. The method of claim 1, wherein the base station system is in communication with a plurality of terminal systems over the communication network, the method further comprising the steps of:
c) receiving at the base station system from at least one of the terminal systems one or more packets of terminal item information;
d) performing method step (b) in relation to the one or more packets of terminal item information received from the at least one terminal system.

8. The method of claim 1, wherein the base station system is in communication with one or more information server systems over the communication network, the method further comprising the steps of:
e) performing a search of at least one of the information server systems over the communication network for item information related to at least one of the base station item identifiers stored in the database of the base station system;
f) receiving at the base station system from at least one of the information server systems one or more packets of item information related to the at least one base station item identifier if there is a match;
g) performing method step (b) in relation to the one or more packets of item information received from the at least one information server system.

9. The method of claim 1, wherein the received item information is ranked as:
1) high priority data if the source of item information is from at least one of the item information supplier systems;
2) medium priority data if the source of item information is from at least one information server system; and
3) low priority if the source of item information is from at least one of a plurality terminal systems.

10. A method of distributing barcode information to a terminal system from a base station system for use in updating or maintaining a local database of item information at the terminal system, wherein the base station system is in communication with the terminal system over a communication network and the base station comprises a database server including a database of item information related to a plurality of base station item identifiers representative of barcode information;

the method comprising the steps of:
a) receiving at the base station system an item request message from the terminal system, the item request message including at least one terminal item identifier;
b) performing a search of the database of the base station system based on the terminal item identifier to retrieve, if a match is found between at least one of the base station item identifiers and the at least one terminal identifier, one or more records of item information associated with the at least one terminal item identifier;
c) compiling a list of the retrieved item information related to the at least one terminal item identifier;
d) transmitting one or more packets of the list of item information from the base station system to the terminal system for inclusion of item information selected from the transmitted list of item information into the local database.

11. The method of claim 10, wherein the item request message further includes a list of preferred information suppliers, and the method step (b) further comprises performing the search of the database based on the list of preferred suppliers and the terminal item identifier.

12. The method of claim 10, wherein the base station system includes storing a list of preferred suppliers supplied by the terminal system in a profile reserved for the terminal system, and the method step (b) further comprises performing the search of the database based on the list of preferred suppliers and the terminal item identifier.

13. The method of claim 10, wherein method step (c) further comprises sorting the list of item information according to a ranking based on where the one or more records of item information stored in the database of the base station system is sourced from.

14. The method of claim 13, wherein the list of item information is ranked from a higher priority if the source of item information is an item information supplier system, to a lower priority if the source of item information is from at least one of a plurality terminal systems.

15. The method of claim 14, wherein the list of item information is ranked at a medium priority if the source of item information is retrieved from an external information server.

16. A method for acquiring barcode information at a terminal system from a base station system for use in updating or maintaining a local database of item information at the terminal system, wherein the base station system is in communication with the terminal system over a communication network and the base station system comprises a database server including a database of item information related to a plurality of base station item identifiers representative of barcode information;
the method comprising the steps of:
a) receiving at the terminal system at least one terminal item identifier;
b) transmitting from the terminal system to the base station system an item request message, the item request message including the at least one terminal item identifier;
c) receiving at the terminal system one or more packets of item information from the base station system if the at least one terminal item identifier corresponds with at least one of the plurality of base station item identifiers, the one or more packets of item information including a list of one or more item information related to the terminal item identifier;
d) selecting from the list of one or more item information the most relevant item information for inclusion in the terminal system's local database.

17. The method of claim 16, wherein the step of receiving the terminal item identifier includes scanning or transmitting a representation of the terminal item identifier.

18. The method of claim 16, wherein the step of receiving the terminal item identifier includes manually inputting a representation of the terminal item identifier into the terminal system.

19. The method of claim 16, wherein the item request message further includes a list of preferred information suppliers for use in retrieving the list of item information from the database of the base station system.

20. The method of claim 16, wherein the received list of item information is sorted according to a ranking based on where the one or more records of item information stored in the database of the base station system is sourced from.

21. The method of claim 20, wherein the list of item information is ranked at a high priority if the source of item information is an item information supplier system, at a medium priority if the source of item information is retrieved from an external information server, at a low priority if the source of item information is received from at least one of a plurality terminal systems.

22. A base station system for distributing barcode information to a terminal system for use in updating or maintaining a local database of item information at the terminal system, wherein the base station system is in communication with the terminal system over a communication network and the base station system comprises means for controlling a database of item information related to a plurality of base station item identifiers representative of barcode information;
the base station system comprising:
a) means for receiving an item request message from the terminal system, the item request message including at least one terminal item identifier;
b) means for performing a search of the database of the base station system based on the terminal item identifier, and means for retrieving, if a match between at least one of the base station item identifiers and the at least one terminal identifier is found in the search, one or more records of item information associated with the at least one terminal item identifier;
c) means for compiling a list of the one or more records of item information from the base station database related to the at least one terminal item identifier;
d) means for transmitting one or more packets of the list of item information from the base station system to the terminal system for inclusion of item information selected from the transmitted list of item information into the local database.

23. A terminal system for acquiring barcode information from a base station system for use in updating or maintaining a local database of item information at the terminal system, wherein the base station system is in communication with the terminal system over a communications network and the base station system comprises a database server including a database of item information related to a plurality of base station item identifiers representative of barcode information;
the terminal system comprising:
a) means for receiving at least one terminal item identifier;
b) means for transmitting to the base station system an item request message, the item request message including the at least one terminal item identifier;
c) means for receiving one or more packets of item information from the base station system if the at least one terminal item identifier corresponds with at least one of the plurality of base station item identifiers, the one or more packets of item information including a list of one or more item information from the base station database server related to the terminal item identifier;
d) means for selecting from the list of one or more item information the most relevant item information for inclusion into the terminal system's local database.

24. The terminal system of claim 23, wherein the means for receiving the terminal item identifier comprises a scanner for scanning a representation of the terminal item identifier.

25. A system for storing and distributing barcode information comprising at least one base station system, at least one terminal system, and a communication network, the base station system being adapted to distribute barcode information to the terminal system for use in updating or maintaining a local database of item information at the terminal system, wherein the base station system is in communication with the terminal system over the communication network and the base station system comprises means for controlling a database of item information related to a plurality of base station item identifiers representative of barcode information;

the base station system comprising:
a) means for receiving an item request message from the terminal system, the item request message including at least one terminal item identifier:
b) means for performing a search of the database of the base station system based on the terminal item identifier, and means for retrieving, if a match is found between at least one of the base station item identifiers and the at least one terminal identifier, one or more records of item information associated with the at least one terminal item identifier;
c means for compiling a list of the one or more records of item information from the base station database related to the at least one terminal item identifier; and
d) means for transmitting one or more packets of the list of item information from the base station system to the terminal system for inclusion of item information selected from the transmitted list of item information into the local database;

the terminal system comprising:
i) means for receiving at least one terminal item identifier;
ii) means for transmitting to the base station system the item request message, the item request message including the at least one terminal item identifier;
iii) means for receiving one or more packets of item information from the base station system if the at least one terminal item identifier corresponds with at least one of the plurality of base station item identifiers, the one or more packets of item information including a list of one or more item information from the base station database server related to the terminal item identifier; and
iv) means for selecting from the list of one or more item information the most relevant item information for inclusion into the terminal system's local database.

* * * * *